United States Patent
Shiu et al.

(10) Patent No.: US 7,330,452 B2
(45) Date of Patent: Feb. 12, 2008

(54) INTER-FREQUENCY NEIGHBOR LIST SEARCHING

(75) Inventors: Da-shan Shiu, Cupertino, CA (US); Thomas B. Wilborn, San Diego, CA (US); Roland Rick, San Diego, CA (US); Srinivasa Rao Nagaram, San Diego, CA (US); Chalapathi Rao Emani, San Diego, CA (US); Ramachandran Gurumoorthy, San Diego, CA (US); Jesus Chao, San Diego, CA (US); Steve Doerfler, Erie, CO (US); Peter Ang, San Diego, CA (US); Srividya Kunisetti, San Diego, CA (US); Gwang-Hyun Gho, Austin, TX (US); Thomas Bailey, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 957 days.

(21) Appl. No.: 10/461,270

(22) Filed: Jun. 13, 2003

(65) Prior Publication Data

US 2004/0252656 A1   Dec. 16, 2004

(51) Int. Cl.
*H04B 7/216* (2006.01)
(52) U.S. Cl. ............... 370/335; 370/342; 370/441; 375/147
(58) Field of Classification Search ........... 370/203, 370/209, 515, 328, 342, 441, 320, 335, 479, 370/252; 375/134, 137, 152, 367, 354, 145, 375/130, 150, 377

See application file for complete search history.

(56) References Cited

U.S. PATENT DOCUMENTS

| | | | | |
|---|---|---|---|---|
| 5,440,597 A | * | 8/1995 | Chung et al. | 375/149 |
| 5,644,591 A | | 7/1997 | Sutton | |
| 5,805,648 A | * | 9/1998 | Sutton | 375/367 |
| 6,134,440 A | * | 10/2000 | Black | 455/436 |
| 6,377,615 B1 | | 4/2002 | Sourour et al. | |
| 6,396,804 B2 | * | 5/2002 | Odenwalder | 370/209 |

FOREIGN PATENT DOCUMENTS

WO      03030390      4/2003

\* cited by examiner

*Primary Examiner*—Ricky Q. Ngo
*Assistant Examiner*—Kibrom T Hailu
(74) *Attorney, Agent, or Firm*—George C. Pappas; Thomas Rouse; Francois A. Pelaez

(57) ABSTRACT

Techniques for inter-frequency neighbor list searching are disclosed. Embodiments disclosed herein address the need for inter-frequency neighbor list searching. In one embodiment, a searcher is deployed to search a PN space with a first set of search parameters and to return search results. A subset of those results are selected, along with a previously saved search result, to form a set of PN locations for a second search. The second search is performed on a window around each of the PN locations, using a second set of search parameters. The maximum peak from the second search is saved for use in future iterations. In one embodiment, the subset is selected as the highest energy level peaks from the first search. In one embodiment, if a maximum peak is deemed to correspond to a valid base station when the position of that maximum peak is within a pre-determined time offset from a previous maximum peak.

13 Claims, 5 Drawing Sheets

INTER-FREQUENCY NEIGHBOR LIST SEARCHING

FIELD

The present invention relates generally to wireless communications, and more specifically to searching inter-frequency neighbor lists in wireless communications.

BACKGROUND

Wireless communication systems are widely deployed to provide various types of communication such as voice and data. These systems may be based on code division multiple access (CDMA), time division multiple access (TDMA), or some other multiple access techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the Wide-band Code Division Multiple Access (W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards. An example non-CDMA system is the Global System for Mobile communication (GSM) system.

Neighboring systems may employ one or more radio access technologies on one or more frequencies. Furthermore, a system may have one radio access technology overlaying another. For example, portions of a GSM system may be overlapped with W-CDMA base stations. It may be desirable for a mobile station communicating on the GSM system to handoff to the W-CDMA system without dropping an active call.

To facilitate such handoff, a mobile station must periodically search for base stations on alternate frequencies and/or alternate radio access technologies. In some communication systems, a list of potential neighboring base stations is transmitted from a base station to a mobile station. This list is commonly referred to as a neighbor list. By limiting searches to those base stations on the neighbor list, a mobile station can reduce the amount of time required for such searching. However, when searching is required on an alternate frequency, the time available for such searching may be limited while an active call is in session. There is therefore a need in the art for inter-frequency neighbor list searching.

SUMMARY

Embodiments disclosed herein address the need for inter-frequency neighbor list searching. In one embodiment, a searcher is deployed to search a pseudo noise (PN) space with a first set of search parameters and to return search results. A subset of those results are selected, along with a previously saved search result, to form a set of PN locations for a second search. The second search is performed on a window around each of the PN locations, using a second set of search parameters. The maximum peak from the second search is saved for use in future iterations. In one embodiment, the maximum peak is reported as a valid neighbor base station if a pre-determined criteria is met. In one embodiment, the subset is selected as the highest energy level peaks from the first search. In one embodiment, if a maximum peak is deemed to correspond to a valid base station when the position of that maximum peak is within a pre-determined time offset from a previous maximum peak. Various other embodiments are also presented having benefits including efficient inter-frequency searching which allows for improved base station selection and therefore improved performance and system capacity, and searching without the need for threshold calculations.

DETAILED DESCRIPTION

Figure 1:
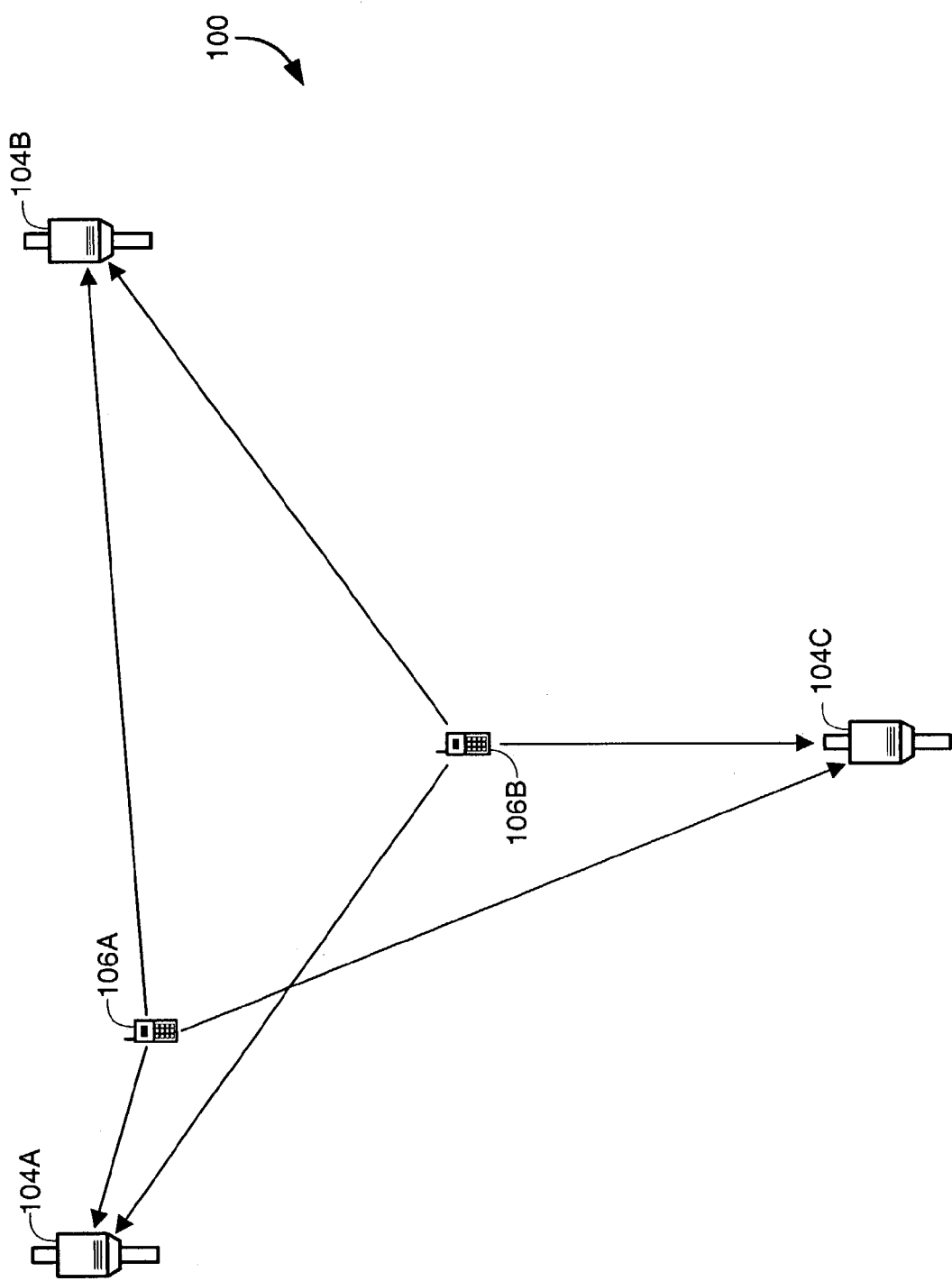
FIG. 1 is a general block diagram of a wireless communication system shown to support a number of users.

FIG. 1 is a diagram of a wireless communication system 100 that may be designed to support one or more wireless standards and/or designs (e.g., the W-CDMA standard, the IS-95 standard, the cdma2000 standard, the HDR specification, the Evolution Data/Voice (1xEV-DV proposal, the GSM standard). In the exemplary embodiment, system 100 supports GSM communications as well as W-CDMA communications.

For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or Node B. The term mobile station can be used interchangeably with the terms user equipment (UE), subscriber unit, subscriber station, access terminal, remote terminal, or other corresponding terms known in the art. The term mobile station encompasses fixed wireless applications. A mobile station is an example of a wireless communication device.

Depending on the system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

A mobile station 106, such as 106A, during an active call, communicates with a serving base station, 104A, for example. The serving base station periodically updates a list of potentially available neighboring base stations to the mobile stations with which it is communicating. Each mobile station periodically measures the received signal strength of base stations on the neighbor list, and reports the results of those measurements to the serving base station. Differing wireless communication standards may provide different requirements for reporting. The GSM standard requires a mobile station to search the neighbor list and report the strongest neighbor, if any. The mobile station must measure and report within a specified time period. The exemplary GSM specification requires a mobile station to support searching for neighbor W-CDMA base stations, up to 32 scrambling codes per frequency, for 3 frequencies, within a predetermined period of time. To meet this requirement during an active call, in the exemplary embodiment, mobile station 106 switches frequency, stores received samples in a sample RAM, and processes the samples after returning to the original frequency and resuming the active call.

During an active GSM call, for example, the opportunity to switch frequency for inter-frequency measurements occurs periodically. Given the requirement of supporting search of a minimum number of neighbors and frequencies, and the periodic reporting of results to the serving base station, there is essentially a fixed time allotted to search each neighbor on the neighbor list. This exemplary scenario lends itself to a search method tuned for a fixed search time.

Searching for a pilot signal from a candidate of the neighbor list typically involves determining whether or not the pilot signal, spread with a scrambling code used by the base station, is receivable, and, if so, its timing information, commonly indicated by a time offset. To perform a search within a fixed allotment of time, in the exemplary GSM scenario, mobile station 106 performs a two-stage search process. The first stage quickly scans the entire PN space for the desired scrambling code. The results of the first stage will be one or more candidate peaks. The second stage search comprises windowed searches around selected candidate peaks from the first stage. As is well known in the art, the search parameters used in the stage one search can include longer or shorter integration periods. A longer integration period will produce candidate peaks that are less likely to be false positives, at the expense of increased search time. A shorter integration period may produce more false positives, yet requires less search time.

A two-stage search procedure may not be able to perform a desired search within a fixed period of time. Increasing integration length in stage one may produce good candidates for stage two, although the remaining search time may not be adequate to finish stage two searching on all the candidates. By reducing the integration length in stage one, the number of candidates may grow too large to be processed in stage two within the prescribed time period. In various embodiments described herein, to perform neighbor list searching within a fixed time period, a subset of the stage one results are selected for stage two searching. The integration length for stage one search may be determined by subtracting the amount of time required per candidate for stage two search, multiplied by the number of candidates in the subset, subtracted from the overall time allotment.

By lowering the stage one integration length, additional time is available for stage two to process one or more additional candidates. However, lowering the stage one integration length increases the probability of false positives, thus increasing the probability that selecting a subset from the stage one results will miss the true peak. Those of skill in art will readily adapt the teachings herein to determine the appropriate integration length for stage one search and the number of candidates included in a subset for stage two searching.

During an active call, neighbor list searching repeats indefinitely. If a neighbor base station is not identified during one search because it was not included in the subset passed to stage two, another opportunity to locate this neighbor will arise during the next search process. Those of skill in the art will recognize that the probability of failed detection is related to the likelihood that the number of false positives exceeds the size of the subset.

By the same token, if a neighbor base station is included in the subset passed to second stage searching, it would be possible for that neighbor to be excluded from the subset in a subsequent search, depending on how the subset was selected. However, unlike a false peak, a true peak is likely to remain from search period to search period, at least while the neighbor base station signal remains strong. Thus, one or more peaks from a previous search process are included in the subset delivered for step two searching in the current search process. In the exemplary embodiment, the maximum peak from the previous search is included. If it is a true peak, it will likely remain.

Embodiments detailed below provide for stage one search result subset selection without the need for a calculated threshold. While a threshold may be used, included in the description below, there may be situations where the search performance is sensitive to variations in the threshold chosen. If the threshold is set slightly too high, valid peaks may be discarded, while false positives are passed on for stage two searching. If the threshold is set slightly too low, it may be that the number of candidates grows large too quickly, making the probability of selecting one or more true peaks diminish. Furthermore, the optimum threshold for one mobile station may be different than for another, differently situated, mobile station. In these situations, a subset selection method that does not require a threshold may be desirable.

Selecting a stage two peak for reporting as a validly located neighbor cell may also be done using a calculated threshold, examples of which are detailed below. However, for the same reasons just given, a method not requiring a threshold calculation may be advantageous. In one embodiment, detailed further below, if a peak remains the maximum for consecutive search processes, and its location is within a predetermined offset threshold from the location of the previous process (for example, an offset threshold may be a pre-determined number of PN chips, or time duration, etc.), the peak is deemed valid and a report to the serving base station is made. This is due to the unlikelihood of a false positive consecutively remaining the maximum after more than one second stage search. Thus, an inter-frequency search method is defined that requires no thresholds. It may be embodied wherever a search method is required, but is well suited for situations in which a fixed amount of search time is given, i.e., there is no benefit from early termination or option for increased integration times.

Figure 2:
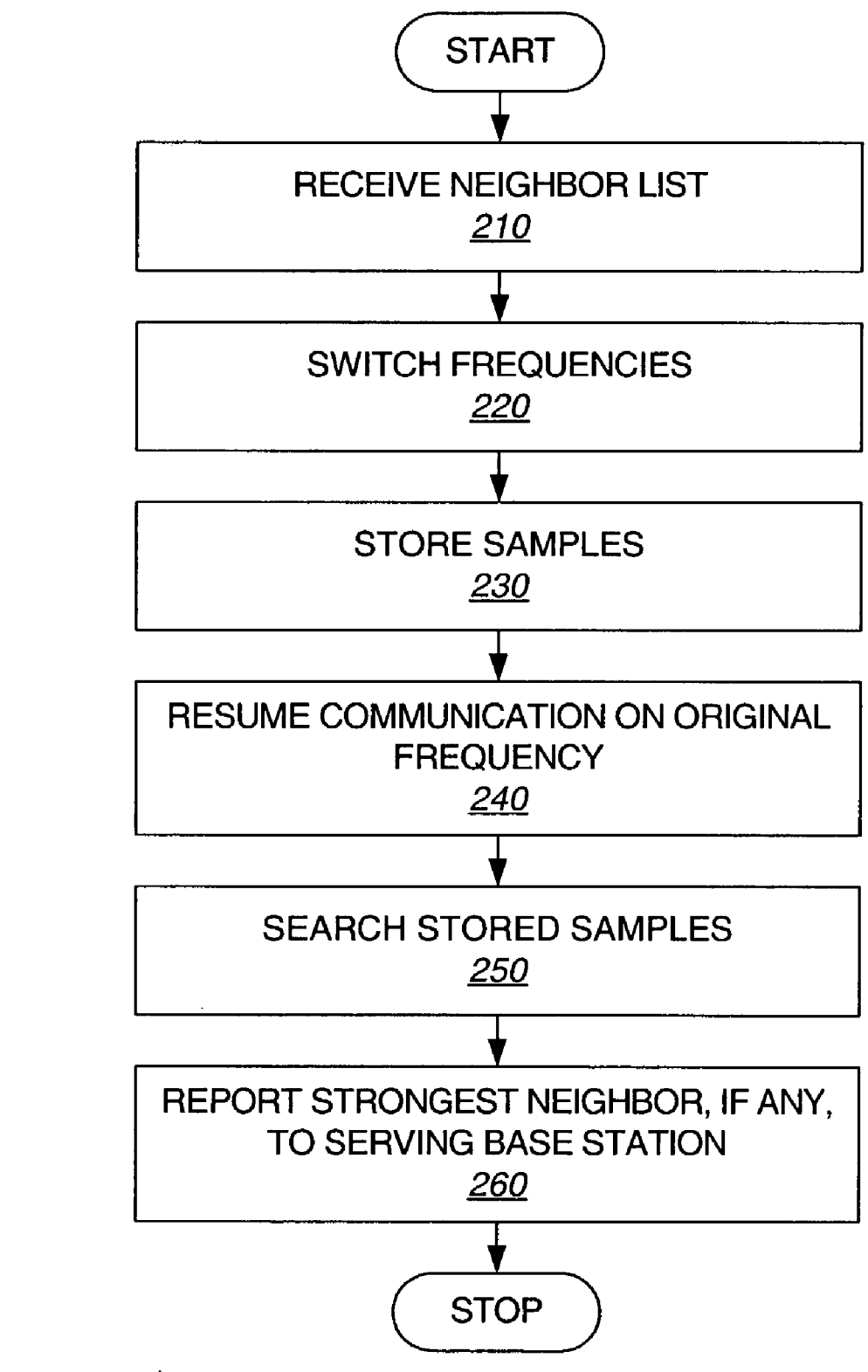
FIG. 2 is a flowchart of a method of performing inter-frequency neighbor list searching.

FIG. 2 is a flowchart of an exemplary method 200 of performing inter-frequency neighbor list searching. The method begins in step 210, in which the mobile station receives a neighbor list from the base station. The neighbor list contains information about potentially available neighboring base stations. In the exemplary embodiment, the neighbor list may include neighbors on alternate frequencies as well as alternate radio access technologies. Scrambling codes may be provided for neighbors configured to perform CDMA communications.

In step 220, the mobile station switches frequencies to perform inter-frequency searching. A variety of techniques for adjusting the receiver frequency of the mobile station are well known in the art. In the exemplary embodiment, the mobile station may be actively communicating on a GSM call, while periodically searching for W-CDMA base stations, identified in the neighbor list, on one or more alternate frequencies. Those of skill in the art will recognize that this method applies with equal force to any combination of radio access technologies and frequencies. The timing of frequency switching may vary depending on the type of system deployed. A system specification may prescribe predetermined intervals during which a mobile station may perform searching on an alternate frequency. In an alternate embodiment, a system specification may prescribe signaling to indicate when a mobile station may switch frequencies without interrupting an active call. In yet another alternative, a mobile station may make its own determination of when a frequency switch is in order. Such a determination may be made based on predictions of future transmission activity or some other mechanism. The frequency switch in step 220 may be performed during any available time interval during which the mobile station may safely interrupt monitoring of the current active frequency, as well as transmission on that frequency, to monitor signals transmitted on an alternate frequency.

In step 230, the mobile station stores samples received on the alternate frequency into a memory for later search processing. In the exemplary embodiment samples received on the alternate frequency are stored into a sample RAM.

Once the desired samples are stored in step 230, which may be a predetermined sample size, or a number limited by the amount of time available for the frequency switch interval, the mobile station may resume communication on the original frequency, shown in step 240.

In step 250, the mobile station may search for one or more candidates from the neighbor list using the stored samples. This processing may be performed in parallel with any number of other communication tasks, such as maintaining an active call. Searching samples in a sample memory, as opposed to searching samples as they are received, is referred to as "offline searching". The embodiments described herein are well suited for offline searching, although the principles disclosed herein are not limited as such. Inter-frequency neighbor list searching, as described, may also be performed directly on incoming received samples.

In step 260, the mobile station reports the strongest neighbor found, if any, to the serving base station. In the exemplary embodiment, the mobile station has a fixed amount of time to perform searching of the samples stored during each iteration of method 200. Various embodiments, detailed further below, may be used to perform the offline searching of step 250. Some of the embodiments disclosed herein, while applicable generally, are also suitable for fixed duration searching, i.e. when a limited amount of time is available to search each candidate from the neighbor list, and there is little or no benefit to terminating the search early. Such is the case in the exemplary embodiment, in which the mobile station is directed to report one strongest neighbor base station, if any, during each reporting period. Given the fixed reporting period and the maximum number of candidates for which searching is required, a fixed duration search method or apparatus is well suited to search stored samples in method 200.

Figure 3:
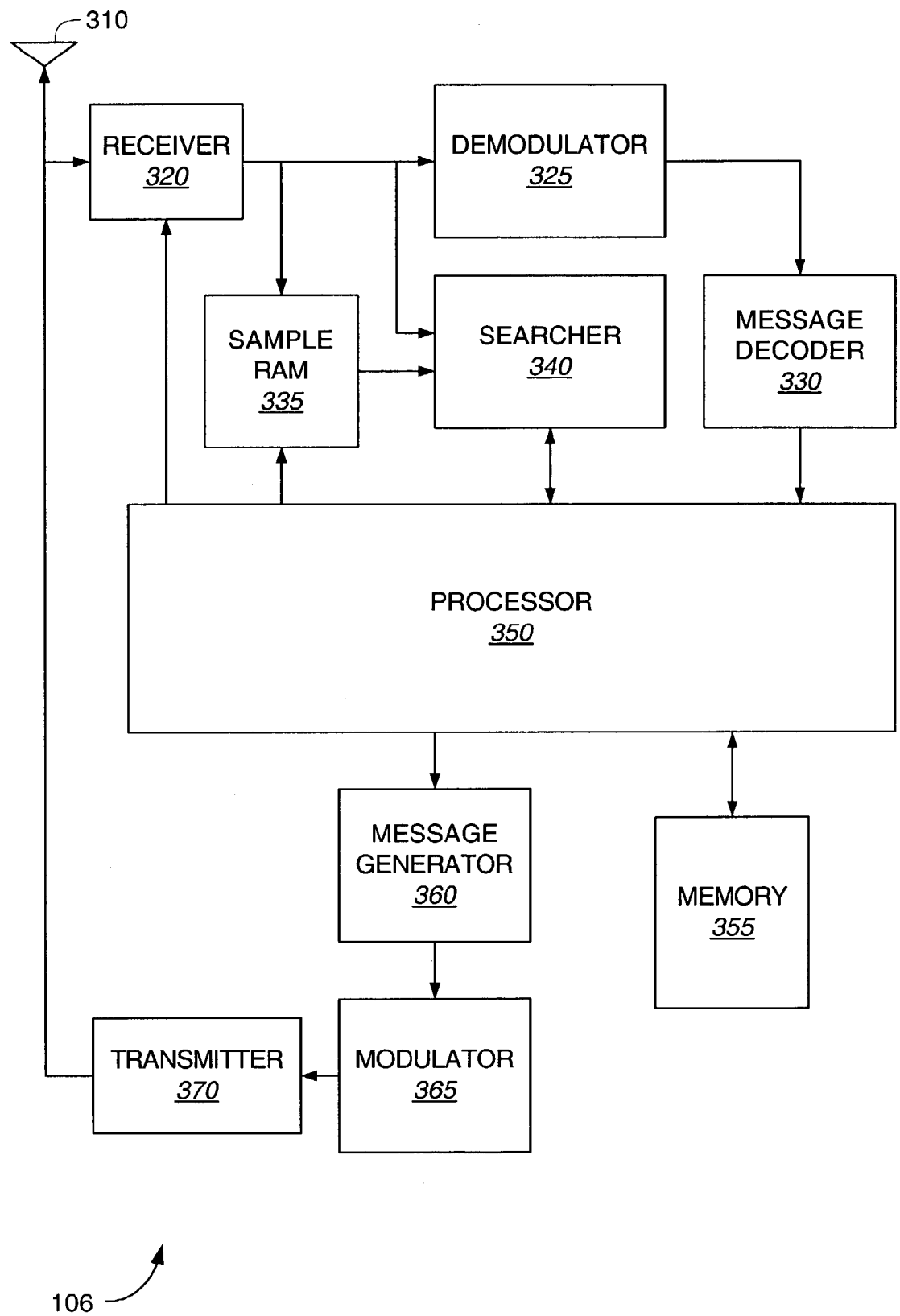
FIG. 3 is a block diagram of a wireless communication device, such as a mobile station.

FIG. 3 is a block diagram of a wireless communication device, such as mobile station 106. The blocks depicted in this example embodiment will generally be a subset of the components included in a mobile station 106. Those of skill in the art will readily adapt the embodiment shown in FIG. 3 for use in any number of mobile station configurations.

Signals are received at antenna 310 and delivered to receiver 320. Receiver 320 performs processing according to one or more wireless system standards, such as the standards listed above. Receiver 320 performs various processing such as Radio Frequency (RF) to baseband conversion, amplification, analog to digital conversion, filtering, and the like. Various techniques for receiving are known in the art. Receiver 320 may receive at various frequencies, as programmed by processor 350.

Signals from receiver 320 are demodulated in demodulator 325 according to one or more communication standards. In an example embodiment, a demodulator capable of demodulating GSM and W-CDMA signals is deployed. In alternate embodiments, alternate standards may be supported, and embodiments may or may not support multiple communication formats. Demodulator 330 may perform RAKE receiving, equalization, combining, deinterleaving, decoding, and various other functions as required by the format of the received signals. Various demodulation techniques are known in the art. Data and control channels are examples of channels that can be received and demodulated in receiver 320 and demodulator 325.

Message decoder 330 receives demodulated data and extracts signals or messages directed to the mobile station 106 on the forward or link. Message decoder 330 decodes various messages used in setting up, maintaining and tearing down a call (including voice or data sessions) on a system. Messages may include neighbor list messages, or control channel messages used for demodulating the forward link. Various other message types are known in the art and may be specified in the various communication standards being supported. The messages are delivered to processor 350 for use in subsequent processing. Some or all of the functions of message decoder 330 may be carried out in processor 350, although a discrete block is shown for clarity of discussion. Alternatively, demodulator 325 may decode certain information and send it directly to processor 350 (a single bit message such as an ACK/NAK or a power control up/down command are examples).

Searcher 340 is also deployed to receive signals from receiver 320. Searcher 340 may perform searching on incoming received samples as well as off-line searching on data from a sample RAM 335. Searcher 340 performs searching in accordance with search parameters provided by processor 350. Processor 350 may also direct searcher 340 to select the output of receiver 320 or the output of sample RAM 335 to provide samples for searching. Sample RAM 335 receives samples from receiver 320, and stores them as directed by processor 350.

Signals are transmitted via antenna 310. Transmitted signals are formatted in transmitter 370 according to one or more wireless system standards, such as those listed above. Examples of components that may be included in transmitter 370 are amplifiers, filters, digital-to-analog (D/A) converters, radio frequency (RF) converters, and the like. Data for transmission is provided to transmitter 370 by modulator 365. Data and control channels can be formatted for transmission in accordance with a variety of formats. Examples of components that may be incorporated in modulator 365 include encoders, interleavers, spreaders, and modulators of various types.

Message generator 360 may be used to prepare messages of various types, as described herein. For example, a message indicating a located neighbor base station may be generated. Various types of control messages may be generated in a mobile station 106 for transmission on the reverse link.

Data received and demodulated in demodulator 325 may be delivered to processor 350 for use in voice or data communications, as well as to various other components. Similarly data for transmission may be directed to modulator 365 and transmitter 370 from processor 350. For example, various data applications may be present on processor 350, or on another processor included in the wireless communication device 106 (not shown). Wireless communication device 106 may include a link to or be incorporated with an external device, such as a laptop computer (not shown).

Processor 350 may be a general-purpose microprocessor, a digital signal processor (DSP), or a special-purpose processor. Processor 350 may perform some or all of the functions of receiver 320, demodulator 325, message decoder 330, searcher 340, message generator 360, modulator 365, or transmitter 370, as well as any other processing required by the wireless communication device. Processor 350 may be connected with special-purpose hardware to assist in these tasks (details not shown). Data or voice applications may be external, such as an externally connected laptop computer or connection to a network, may run on an additional processor within wireless communication device 106 (not shown), or may run on processor 350 itself. Processor 350 is connected with memory 355, which may be used for storing data as well as instructions for performing the various procedures and methods described herein. Those of skill in the art will recognize that memory 355 may be comprised of one or more memory components, of various types, that may be embedded in whole or in part within processor 350.

Figure 4:
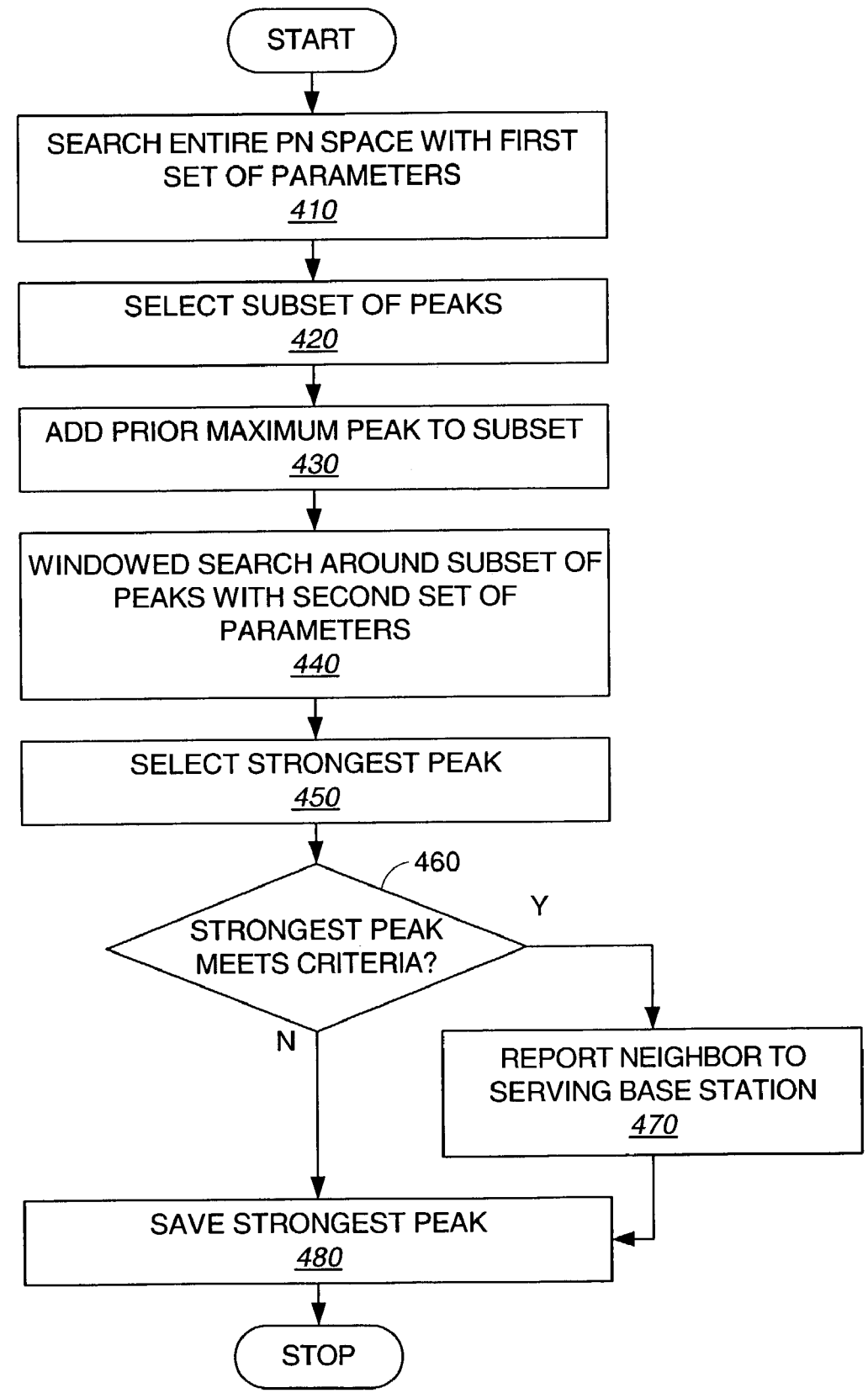
FIG. 4 is a flowchart of a method of fixed-duration searching.

FIG. 4 is a flowchart of exemplary method 400 for fixed-duration searching. Method 400 may be deployed in step 250, described in FIG. 2, above. This method may be repeated during each iteration of a continuously repeating search process. This method may be advantageously deployed when fixed-duration searching is required, although it is not limited as such. This method may also be advantageously deployed when setting specific thresholds for search parameters may be undesirable. This method may be configured so as not to require any set energy threshold either for selecting peaks from a first stage search or for selecting an identified neighbor candidate. In the exemplary GSM embodiment, in which a fixed duration of time is available for searching a predetermined maximum number of W-CDMA neighbor candidates, deploying this method yields both benefits.

Method 400 begins in step 410. Step 410 is the first search stage of a two-stage search method. In this stage, search the entire PN space with a first set of parameters. The PN space will be defined in accordance with the system standard governing the neighbor candidate being searched. Furthermore, a plurality of candidates may be searched during the stage one search, with a scrambling code assigned to each neighbor candidate. (Method 400 may also be pipelined for multiple scrambling codes, as will be described below with respect to FIG. 5.)

Integration length may be among the search parameters used in step 410. Coherent as well as non-coherent integration may be deployed. Various searching techniques are well known in the art. For example a scrambling code may be correlated with incoming samples, the correlated results are then accumulated to produce an energy estimate for a particular offset. This process is repeated for each offset hypothesis desired. In the exemplary embodiment the stage one search covers all the offsets in the PN space. The locations of relatively high energy offsets, referred to herein as peaks, are identified. Peak detectors are known in the art and may be deployed to determine one or more energy peaks during searching, including the stage one search of step 410.

In step 420, a subset of the peaks selected from the stage one search results is selected for further searching in the stage two search. The number of peaks to include in a subset may be determined in accordance with the amount of time available for stage two search for each selected peaks. Any method of selecting the subset of peaks may be deployed within the scope of the present invention. For example, when the stage one integration time is low enough that a relatively large number of false positives is to be expected, a random selection of peaks exceeding a threshold may be chosen to form the subset.

In the exemplary embodiment, the peaks selected for the subset in step 420 are those with the highest energy. For example, if N is the number of peaks from the stage one search included in the subset, then the N peaks with the highest energy are selected. Note that, since the peaks are ranked and selected in decreasing order of energy magnitude, no threshold needs to be calculated in order to determine whether or not a stage one peak passes to stage two.

In step 430, the maximum peak from a prior iteration, if any, of method 400 is added to the subset of peaks selected from the stage one search. The maximum peak is determined in the stage two search. Thus, since a valid neighbor base station is likely to be located in subsequent stage two searches, including the previously determined stage two search result in a subset prevents that candidate from being discarded during the stage one subset selection.

In step 440, stage two search is performed. In stage two, a windowed search is performed around each of the peaks in the subset using a second set of search parameters. In the exemplary embodiment, the second set of search parameters include longer integration time than the first set of search parameters used in step 410. However, the second set of search parameters are not limited as such, and may be identical to the first set of search parameters or may be any other set of valid parameters.

In step 450, the strongest peak from the second stage search is selected. In decision block 460, if the strongest peak selected in step 450 meets a predetermined criteria, proceed to step 470 to report the located neighbor to the serving base station. In the exemplary GSM system, a message is defined for reporting the neighbor base station to the serving base station. In decision block 460, if the strongest peak selected in step 450 does not meet the predetermined criteria, proceed to step 480. Various means for determining if a peak corresponds to an actual neighbor base station are known in the art. For example, one predetermined criteria may be to test if the strongest peak exceeds a predetermined threshold.

In order to avoid the requirement for calculating an appropriate threshold, in the exemplary embodiment, the following criteria is used: if the strongest peak determined in stage two searching, i.e. step 450, is the same as the strongest peak determined in the prior iteration of method 400, then the peak is determined to corresponds to a valid neighbor base station. This is because it is unlikely for a false peak to remain the strongest peak, after stage two searching, for consecutive search periods. In the exemplary embodiment, the current strongest peak is determined to be the same as the previous strongest peak if it is within a predetermined time offset from the location of the previous peak (and corresponds to the same scrambling code, it multiple scrambling codes are being searched). During the initial iteration of method 400, there will not be a prior saved strongest peak. During this initial iteration, the current strongest peak may be deemed not to meet the criteria, and the method proceeds to step 480 to save the current strongest peak for use in a subsequent iteration.

From either step 470 or decision block 460, proceed to step 480. In step 480, save the strongest peak from the current stage two search for use in subsequent iterations of method 400, as described above. Then the process may stop. However, as described, method 400 may be repeated or iterated indefinitely, for as long as inter-frequency neighbor list searching is desired.

Figure 5:
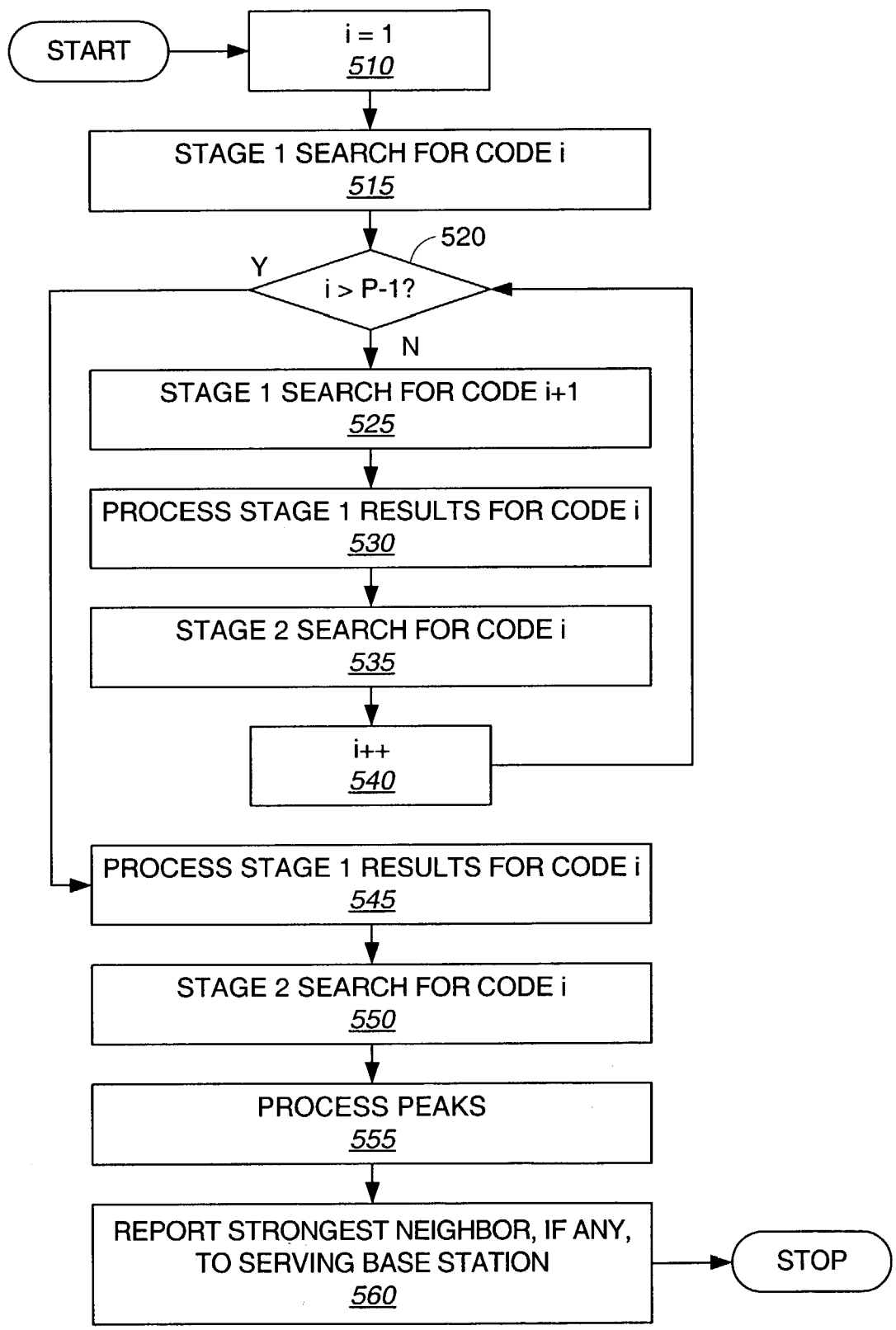
FIG. 5 is a flowchart of a method of pipelined stage one and stage two searching.

FIG. 5 is a flowchart of an exemplary method 500 of pipelined stage one and stage two searching. Pipelined stage one and stage two searching may be useful when a processor, such as processor 350, can perform computations on search results while a searcher, such a searcher 340, simultaneously performs search tasks. In this example, there are P scrambling codes corresponding to P neighbors from the neighbor list to be searched. The variable i is used to iterate through each of the P scrambling codes.

In step 510, i is set to one to begin processing the first scrambling code. In step 515, the stage one search is performed for code i, in similar fashion as described with respect to FIG. 4. Proceed to decision block 520. In decision block 520, if i is greater than P−1, then the list of scrambling codes has been exhausted and the process proceeds to step 545, described below. Otherwise, additional codes remain to be searched, proceed to step 525.

In step 525, perform stage one searching for code i+1. Simultaneously, in step 530, the stage one results for code i may be processed. The processing may include selecting a subset of peaks, including adding a previous maximum peak, when available, as described above. Furthermore, the appropriate set of stage two search parameters may be determined.

In step 535, the stage two search for code i may commence based on the results processed in step 530. When the searcher becomes available again, subsequent to search in step 535, the next code iterations may begin. This is shown in FIG. 5 by incrementing i and proceeding back to decision block 520 to determine if additional scrambling codes remain to be processed, as described above. Once the loop formed by steps 520 to 540 is exited via decision block 520, proceed to step 545.

In the previous loop the final scrambling code was used for a step one search, but the results were not yet processed. This is performed in step 545. Note that, in similar fashion to steps 525 and 530, step 545 may be processed simultaneously with step 535.

In step 550, stage two search for the final code is performed using the results from step 545. In step 555, the peaks are processed from the various stage two searches. The peak processing may be performed in similar fashion to decision block 460, described above with respect to FIG. 4.

As before, a threshold may be used to determine if a stage two peak corresponds to a valid neighbor. Alternatively, to avoid using a threshold, the peak may be compared with a peak from a prior iteration of method 500 to determine if the peak is a valid neighbor, as described above. In this alternative, the maximum peak for each scrambling code is stored for use in subsequent iterations.

In step 560, the strongest neighbor, if any, may be reported to the serving base station. In the exemplary GSM system, only a single base station is reported in any one message. Accordingly, in one embodiment, the maximum valid peak is selected should more than one meet the criteria. In an alternate embodiment, more than one peak may be reported as valid neighbor base stations when each meets the criteria. Then the process may stop. As with method 400, method 500 may be iterated indefinitely for as long as inter-frequency neighbor list searching is desired.

It should be noted that, in all the embodiments described above, method steps can be interchanged without departing from the scope of the invention. The descriptions disclosed herein have in many cases referred to signals, parameters, and procedures associated with the GSM or W-CDMA standards, but the scope of the present invention is not limited as such. Those of skill in the art will readily apply the principles herein to various other communication systems. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
   a searcher for searching a PN space with a first set of parameters to produce a plurality of first search results and for searching a window around a plurality of selected pseudo noise (PN) locations with a second set of parameters to produce a plurality of second search results;
   a processor for selecting a subset of the plurality of first search results, combining the subset with a stored search result to form the plurality of selected PN locations, and for selecting a third search result from the plurality of second search results; and
   a memory for storing the third search result to produce the stored search result.

2. The apparatus of claim 1, further comprising a message generator for generating a message for transmission to a remote station when the third search result meets one or more predetermined criteria, the message including information derived from the third search result.

3. The apparatus of claim 2, wherein the predetermined criteria comprises an energy threshold of received signals.

4. The apparatus of claim 2, wherein the predetermined criteria comprises a maximum offset relative to the position of the stored search result.

5. The apparatus of claim 1, wherein the subset is a predetermined number of highest received signal energy search results.

6. The apparatus of claim 1, wherein the subset is a random selection of search results whose received signal energy exceeds a predetermined threshold.

7. A method of search processing, operable with a searcher for searching in accordance with search parameters and for generating search results, comprising:
   sending a first set of search parameters to the searcher;
   receiving a first plurality of search results generated in response to the first set of search parameters;
   selecting a subset of the first plurality of search results;
   forming a plurality of selected PN locations from the PN locations of the subset and the PN location of a stored search result;
   sending the plurality of selected PN locations to the searcher;
   sending a second set of search parameters to the searcher;
   receiving a second plurality of search results generated in response to the second set of search parameters and the plurality of selected PN locations;
   selecting a highest received signal energy search result from the second plurality of search results; and
   storing the highest received signal energy search result to form the stored search result.

8. The method of claim 7, further comprising sending information corresponding to the highest received signal energy search result to a remote station when the energy of the highest received signal energy search result exceeds a predetermined threshold.

9. The method of claim 7, further comprising sending information corresponding to the highest received signal energy search result to a remote station when the offset of the highest received signal energy search result is within a predetermined maximum offset with respect to the offset out the stored search result.

10. The method of claim 7, wherein the first and second sets of search parameters are identical.

11. The method of claim 7, wherein the second set of search parameters includes a longer integration length than the first set of search parameters.

12. The method of claim 7, wherein the second set of search parameters includes a narrower search window than the first set of search parameters.

13. A computer readable medium for storing instructions capable of being executed by a processor to perform the following steps:
   sending a first set of search parameters to a searcher;
   receiving a first plurality of search results generated in response to the first set of search parameters;
   selecting a subset of the first plurality of search results;
   forming a plurality of selected PN locations from the PN locations of the subset and the PN location of a stored search result;
   sending the plurality of selected PN locations to the searcher;
   sending a second set of search parameters to the searcher;
   receiving a second plurality of search results generated in response to the second set of search parameters and the plurality of selected PN locations;
   selecting a highest received signal energy search result from the second plurality of search results; and
   storing the highest received signal energy search result to form the stored search result.

* * * * *